United States Patent
Ham

(10) Patent No.: US 9,973,682 B2
(45) Date of Patent: May 15, 2018

(54) IMAGE SENSOR INCLUDING AUTO-FOCUSING PIXEL AND IMAGE PROCESSING SYSTEM INCLUDING THE SAME

(71) Applicant: SAMSUNG ELECTRONICS CO., LTD., Suwon-si, Gyeonggi-Do (KR)

(72) Inventor: Seog Heon Ham, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/210,602

(22) Filed: Jul. 14, 2016

(65) Prior Publication Data
US 2017/0019584 A1 Jan. 19, 2017

(30) Foreign Application Priority Data
Jul. 15, 2015 (KR) .................. 10-2015-0100219

(51) Int. Cl.
| | |
|---|---|
| *G02B 13/16* | (2006.01) |
| *H04N 5/225* | (2006.01) |
| *H04N 5/232* | (2006.01) |
| *H04N 5/374* | (2011.01) |
| *H04N 5/369* | (2011.01) |
| *H04N 5/378* | (2011.01) |
| *H04N 5/3745* | (2011.01) |

(52) U.S. Cl.
CPC ....... *H04N 5/23212* (2013.01); *H04N 5/3696* (2013.01); *H04N 5/374* (2013.01); *H04N 5/378* (2013.01); *H04N 5/37457* (2013.01)

(58) Field of Classification Search
CPC .... H04N 5/23212; H04N 5/378; H04N 5/374; H04N 5/3696

USPC ................ 348/335, 340, 345, 348, 350, 352
See application file for complete search history.

(56) References Cited

U.S. PATENT DOCUMENTS

| | | | |
|---|---|---|---|
| 8,049,801 B2 | 11/2011 | Kusaka | |
| 8,102,460 B2 | 1/2012 | Awazu | |
| 8,466,998 B2 | 6/2013 | Suzuki | |
| 8,582,019 B2 | 11/2013 | Fujii et al. | |
| 8,704,942 B2 | 4/2014 | Shimoda et al. | |
| 8,711,270 B2 | 4/2014 | Onuki et al. | |
| 8,723,992 B2 | 5/2014 | Endo et al. | |
| 8,749,695 B2 | 6/2014 | Kita | |
| 8,860,871 B2 | 10/2014 | Aoki | |
| 9,136,294 B1* | 9/2015 | Pyeoun | H01L 27/1462 |
| 2002/0121652 A1* | 9/2002 | Yamasaki | G02B 7/34 |
| | | | 257/222 |

(Continued)

FOREIGN PATENT DOCUMENTS

| | | |
|---|---|---|
| JP | 2007271296 | 10/2007 |
| JP | 2008017116 | 1/2008 |
| JP | 2014033055 | 2/2014 |

*Primary Examiner* — Yogesh Aggarwal
(74) *Attorney, Agent, or Firm* — Volentine, Whitt & Francos, PLLC

(57) ABSTRACT

An image sensor includes a pixel array including first to fourth pixels having an R, G, and B Bayer pattern. An analog-to-digital converter (ADC) block converts a pixel signal of each of the first to fourth pixels into a digital pixel signal. At least one among the first to fourth pixels includes two photo diodes separated in a first direction, and at least one other of the first to fourth pixels includes two photo diodes separated in a second direction which is different from the first direction.

15 Claims, 12 Drawing Sheets

(56) References Cited

U.S. PATENT DOCUMENTS

2009/0322917 A1* 12/2009 Kyogoku .......... H01L 27/14621
   348/273
2012/0249846 A1 10/2012 Nishio et al.
2013/0057744 A1* 3/2013 Minagawa ......... H04N 5/35563
   348/311

* cited by examiner

IMAGE SENSOR INCLUDING AUTO-FOCUSING PIXEL AND IMAGE PROCESSING SYSTEM INCLUDING THE SAME

CROSS-REFERENCE TO RELATED APPLICATION

This application claims priority under 35 U.S.C. § 119(a) to Korean Patent Application No. 10-2015-0100219, filed on Jul. 15, 2015, the disclosure of which is hereby incorporated by reference in its entirety.

BACKGROUND

Exemplary embodiments of the disclosure relate to an image sensor and an image processing system including the same, and more particularly, to an image sensor including an auto-focusing pixel having a 2-photo diode (PD) structure and an image processing system including the same.

Complementary metal-oxide semiconductor (CMOS) image sensors are solid type imaging devices using a CMOS. CMOS image sensors are inexpensive to manufacture and have a small size to reduce power consumption, compared to charge-coupled device (CCD) image sensors employing high-voltage analog circuits. As the performances of CMOS image sensors have been improved more than at the initial development stage thereof, the CMOS sensors are installed mainly in home appliances including portable devices, such as smart phones, digital cameras, etc.

In a pixel array included in a CMOS image sensor, each pixel includes a photoelectric conversion element. The photoelectric conversion element may generate an electrical signal that changes according to the amount of light incident thereon. The CMOS image sensor may synthesize an image by processing the electrical signal.

Recently, cameras have been developed to have an auto-focusing function of automatically bringing a camera into focus. In order to perform the auto-focusing function, a signal on which auto-focusing information is based should be generated. Recently, many attempts have been made to generate auto-focusing information by adding pixels for auto-focusing into a pixel light-receiving unit included in a CMOS image sensor without using an additional optical system.

SUMMARY

According to an aspect of the disclosure, an image sensor includes a pixel array including first to fourth pixels having an R, G, and B Bayer pattern; an analog-to-digital converter (ADC) block configured to convert a pixel signal of each of the first to fourth pixels into a digital pixel signal; and a control block configured to control the pixel array and the ADC block.

At least one among the first to fourth pixels includes two photo diodes separated in a first direction, and at least one other of the first to fourth pixels includes two photo diodes separated in a second direction which is different from the first direction.

In one exemplary embodiment, the first and fourth pixels may be green pixels each including a green filter, the second pixel may be a red pixel including a red filter, and the third pixel may be a blue pixel including a blue filter.

In one exemplary embodiment, a difference between the first direction and the second direction may be an angle of 90 degrees.

In one exemplary embodiment, the first to fourth pixels may be arranged in a row direction and a column direction, and the first direction may be the column direction and the second direction may be the row direction.

In one exemplary embodiment, the first to fourth pixels may be arranged in a row direction and a column direction, and the first direction may be the row direction and the second direction may be the column direction.

In one exemplary embodiment, the two photo diodes included in each of the first and fourth pixels may accumulate a photocharge corresponding to intensity of incident light passing through one micro-lens.

In one exemplary embodiment, each of the first and fourth pixels may further include one or more transistors configured to convert the photocharge accumulated in the two photo diodes thereof into first and second sub-pixel signals, which are electrical signals, and output the first and second sub-pixel signals.

In one exemplary embodiment, auto-focusing information may be calculated based on a difference between the first and second sub-pixel signals.

In one exemplary embodiment, the first and second sub-pixel signals may be simultaneously output via different sub-column lines.

In one exemplary embodiment, the first and second sub-pixel signals may be sequentially output via the same column line.

According to another aspect of the disclosure, an image sensor includes a pixel array including a plurality of pixels having an R, G, and B Bayer pattern; and an analog-to-digital converter (ADC) block configured to convert a pixel signal of each of the plurality of pixels into a digital pixel signal.

The plurality of pixels includes a first-type pixel including two photo diodes separated in a first direction; and a second-type pixel including two photo diodes separated in a second direction which is different from the first direction, Auto-focusing information for the first direction is calculated based on a signal output from the first-type pixel, and auto-focusing information for the second direction is calculated based on a signal output from the second-type pixel.

In one exemplary embodiment, the first-type pixel may be a green pixel including a green filter, and the second-type pixel may be a red pixel including a red filter or a blue pixel including a blue filter.

In one exemplary embodiment, each of the plurality of pixels may further include one micro-lens and one or more transistors configured to convert photocharges accumulated in the respective two photo diodes into first and second sub-pixel signals, which are electrical signals, according to an intensity of light passing through the micro-lens and output the first and second sub-pixel signals.

In one exemplary embodiment, auto-focusing information for the first direction may be calculated based on a difference between the first and second sub-pixel signals of the first-type pixel, and auto-focusing information for the second direction may be calculated based on a difference between the first and second sub-pixel signals of the second-type pixel.

According to another aspect of the disclosure, an image processing system includes an image sensor including a pixel array including a plurality of auto-focusing pixels. An analog-to-digital converter (ADC) block is configured to convert a pixel signal of each of the plurality of auto-focusing pixels into a digital pixel signal. An image processor is configured to extract auto-focusing information for an auto-focusing operation from the digital pixel signal.

The auto-focusing pixels include a first-type pixel including two photo diodes separated in a first direction; a second-type pixel including two photo diodes separated in a second direction which is different from the first direction; and a third-type pixel including two photo diodes separated in the first direction or the second direction.

According to another aspect of the disclosure, an image sensor includes a first pixel having two photo diodes disposed on opposite sides of a first axis that bifurcates the first pixel, the first pixel receiving light through a green filter. A second pixel has two photo diodes disposed on opposite sides of a second axis that bifurcates the second pixel, the second pixel receiving light through a red or blue filter. A third pixel has two photo diodes disposed on opposite sides of a third axis that bifurcates the third pixel. A fourth pixel has two photo diodes disposed on opposite sides of a fourth axis that bifurcates the fourth pixel, the fourth pixel receiving light through a green filter. The first and fourth axes are substantially parallel, and the second axis is substantially perpendicular to the first and fourth axes. The first, second, third, and fourth pixels are arranged in a red, green, blue Bayer pattern.

BRIEF DESCRIPTION OF THE DRAWINGS

Exemplary embodiments of the disclosure will be more clearly understood from the following detailed description taken in conjunction with the accompanying drawings in which.

DETAILED DESCRIPTION OF THE EMBODIMENTS

Figure 1:
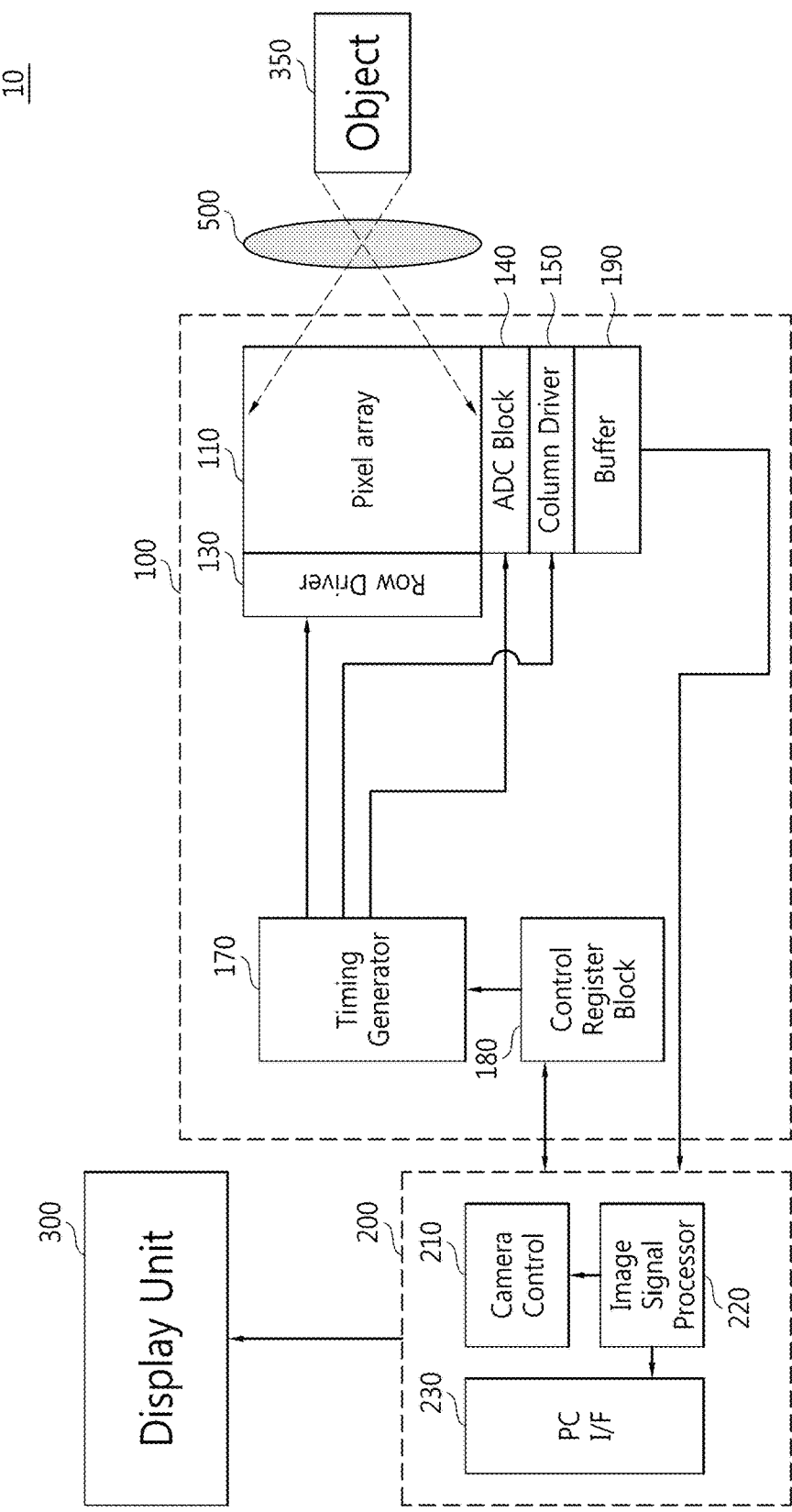
FIG. 1 is a schematic block diagram of an image processing system including an image sensor according to an embodiment of the disclosure.

The disclosure now will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As is traditional in the field of the disclosure, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram of an image processing system 10 including an image sensor 100 according to an embodiment of the disclosure. Referring to FIG. 1, the image processing system 10 according to an embodiment of the disclosure may include the image sensor 100, an image processor (e.g., a digital signal processor (DSP)) 200, a display unit 300, and a lens 500.

The image sensor 100 may include a pixel array 110, a row driver 130, an analog-to-digital converter (hereinafter referred to as 'ADC') block 140, a column driver 150, a timing generator 170, a control register block 180, and a buffer 190.

The image sensor 100 senses an image of an object 350 captured using the lens 500 under control of the DSP 200. The DSP 200 may output an image, which is sensed by and output from the image sensor 100, to the display unit 300. In this case, examples of the display unit 300 include various types of devices capable of outputting an image. For example, the display unit 300 may be a computer, a mobile phone, an electronic device including a camera, etc.

In this case, the DSP 200 may include a camera control 210, an image signal processor (ISP) 220, and a personal computer interface (PC I/F) 230. The camera control 210 controls the control register block 180. In this case, the camera control 210 may control the image sensor 100 (e.g., the control register block 180) according to predetermined standards.

The ISP 220 receives image data which is an output signal of the buffer 190, processes/handles the image data to be seen to human eyes, and outputs the processed/handled image data to the display unit 300 via the PC I/F 230.

Although FIG. 1 illustrates that the ISP 220 is included in the DSP 200, the location of the ISP 220 may be changed by those of ordinary skill in the art. For example, the ISP 220 may be included in the image sensor 100.

The pixel array 110 includes a plurality of pixels (e.g., pixels P11 to Pnm 120 of FIG. 2), each of which includes a photoelectric conversion device such as a photo diode, a pinned photo diode, etc. Each of the plurality of pixels P11 to Pnm 120 generates an image signal by sensing light and converting the light into an electrical signal by using the photoelectric conversion device.

The timing generator 170 may control operations or timings of the row driver 130 and the column driver 150 by outputting a control signal or a clock signal thereto. The control register block 180 may provide the timing generator 170 with a control signal or a clock signal received from the DSP 200.

Figure 2:
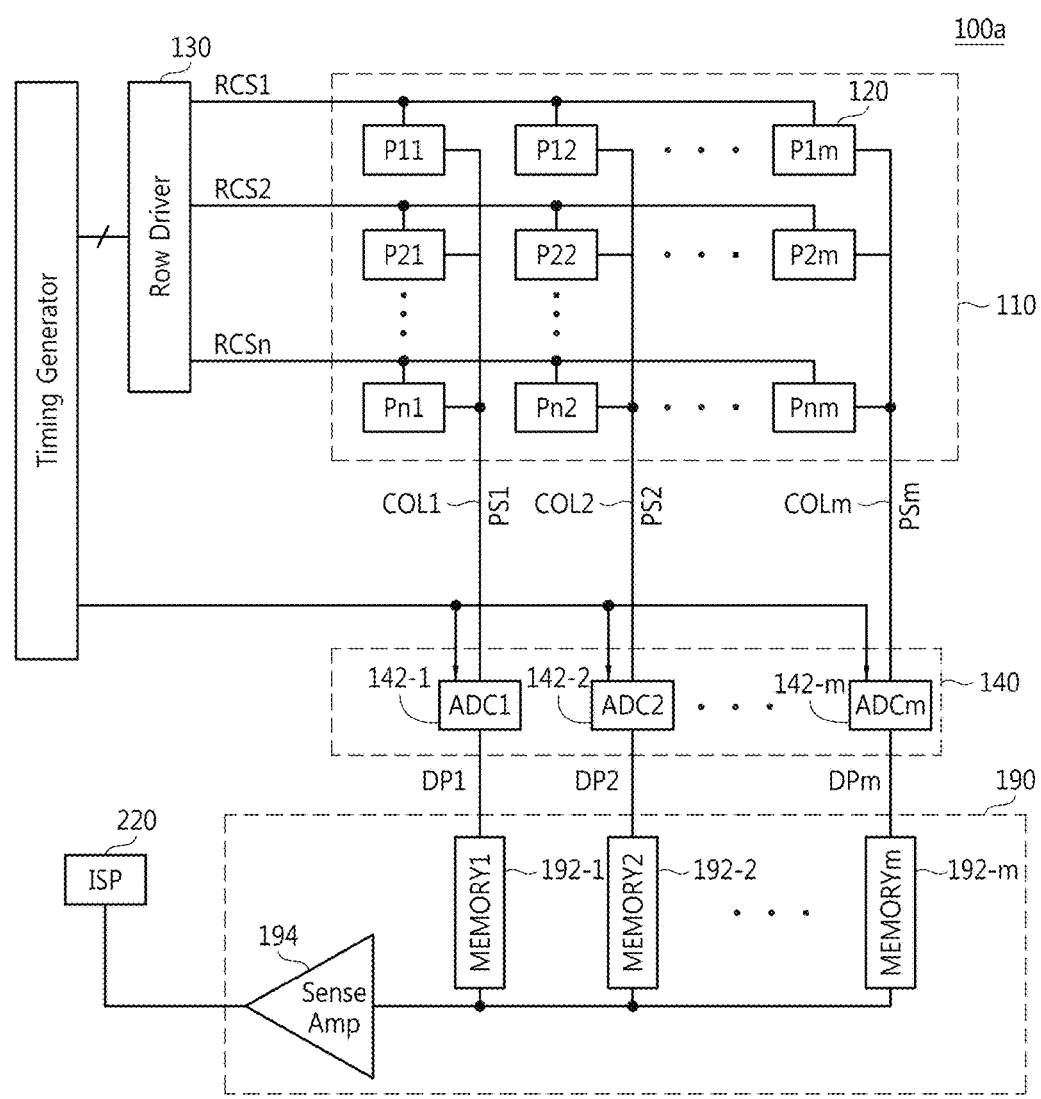
FIG. 2 is a diagram illustrating in more detail the structure of the image sensor of FIG. 1.

The row driver 130 drives the pixel array 110 in units of rows. For example, the row driver 130 may generate row control signals (e.g., row controls signals RCS1 to RCSn of FIG. 2) for respectively controlling the plurality of pixels P11 to Pnm 120 of the pixel array 110. The pixel array 110 outputs, to the ADC block 140, pixel signals (e.g., pixel signals PS1 to PSm of FIG. 2) from rows selected according to the row control signals RCS1 to RCSn generated by the row driver 130. The pixel signals PS1 to PSm of FIG. 2 are analog pixel signals.

The ADC block 140 converts the pixel signals (e.g., the pixel signals PS1 to PSm of FIG. 2) output from the pixel array 110 into digital pixel signals (e.g., digital pixel signals DP1 to DPm of FIG. 2), and outputs the digital pixel signals to the buffer 190. In one exemplary embodiment, the ADC block 140 may convert the pixel signals (e.g., the pixel signals PS1 to PSm of FIG. 2) into the digital pixel signals (e.g., the digital pixel signals DP1 to DPm of FIG. 2), based on a ramp signal (not shown).

The column driver 150 may control operations of the ADC block 140 and the buffer 190 under control of the timing generator 170. That is, the column driver 150 may control pixel signals to be output from or not to be output from respective columns of the pixel array 110, and timings when digital pixel signals are to be generated and output.

The buffer 190 temporarily stores the digital pixel signals (e.g., the digital pixel signals DP1 to DPm of FIG. 2) output from the ADC block 140, and sense, amplify, and output the digital pixel signals.

FIG. 2 is a diagram illustrating in more detail the structure of an image sensor 100*a* such as that shown in FIG. 1. Referring to FIGS. 1 and 2, elements of the image sensor 100*a* of FIG. 2, illustrated to explain an operation of the image sensor 100 of FIG. 1, are substantially the same as those of the image sensor 100.

The image sensor 100*a* includes a pixel array 110, a row driver 130, an ADC block 140, and a buffer 190.

The pixel array 110 may include the pixels P11 to Pnm 120 connected to a plurality of row lines and a plurality of column lines COL1 to COLm. The pixels P11 to Pnm 120 may be arranged in a row direction and a column direction.

The pixels P11 to Pnm 120 may be sequentially activated to respectively output the pixel signals PS1 to PSm to the column lines COL1 to COLm, according to the row control signals RCS1 to RCSn from the row driver 130.

In one exemplary embodiment, each of the column lines COL1 to COLm may include two sub-column lines (e.g., sub-column lines COL1-1 and COL1-2 of FIG. 9), as will be described with reference to FIG. 9 below.

The ADC block 140 may include first to $m^{th}$ ADC units 142-1 to 142-*m*.

The first to $m^{th}$ ADC units 142-1 to 142-*m* may be respectively connected to the first to $m^{th}$ column lines COL1 to COLm, and respectively receive the first to $m^{th}$ pixel signals PS1 to PSm and convert the first to $m^{th}$ pixel signals PS1 to PSm into the digital pixel signal DP1 to DPm.

For example, the first to $m^{th}$ ADC units 142-1 to 142-*m* may compare a ramp signal (not shown) with the first to $m^{th}$ pixel signals PS1 to PSm, generate comparison signals (not shown) based on a result of comparing the ramp signal with the first to $m^{th}$ pixel signals PS1 to PSm, and count the comparison signals to generate the digital pixel signals DP1 to DPm. The digital pixel signals DP1 to DPm may be stored in the buffer 190.

In one exemplary embodiment, when each of the column lines COL1 to COLm includes two sub-column lines (e.g., the sub-column lines COL1-1 and COL1-2 of FIG. 9), each of the first to $m^{th}$ ADC units 142-1 to 142-*m* may include two sub-ADC units (not shown). In this case, each of the sub-ADC units may convert a corresponding sub-pixel signal into a digital signal. In some exemplary embodiments, each of the first to $m^{th}$ ADC units 142-1 to 142-*m* may sequentially convert corresponding two sub-pixel signals into digital signals.

The buffer 190 may include first to $m^{th}$ memories 192-1 to 192-*m* respectively connected to the first to $m^{th}$ ADC units 142-1 to 142-*m*, and a sense amplifier 194.

The first to $m^{th}$ memories 192-1 to 192-*m* may temporarily store the digital pixel signals DP1 to DPm, and sequentially output the digital pixel signals DP1 to DPm to the sense amplifier 194 under control of the column driver 150. The sense amplifier 194 may sense and amplify the digital pixel signals DP1 to DPm, and output the amplified digital pixel signals DP1 to DPm to the ISP 220.

The ISP 220 may process the digital pixel signals DP1 to DPm.

FIGS. 3 to 8 illustrate various examples of the pixel array 110 of FIG. 2 according to embodiments of the disclosure.

FIGS. 3 to 8 each illustrate only four pixels among the pixels of the pixel array 110 (e.g., pixels 120-1A to 120-1D in FIG. 3) for convenience of explanation. The pixel array 110 may further include pixels having the substantially same structure as those of the four pixels.

The four pixels (e.g., the pixels 120-1A to 120-1D of FIG. 3) may be auto-focusing pixels for generating auto-focusing information.

Figure 3:
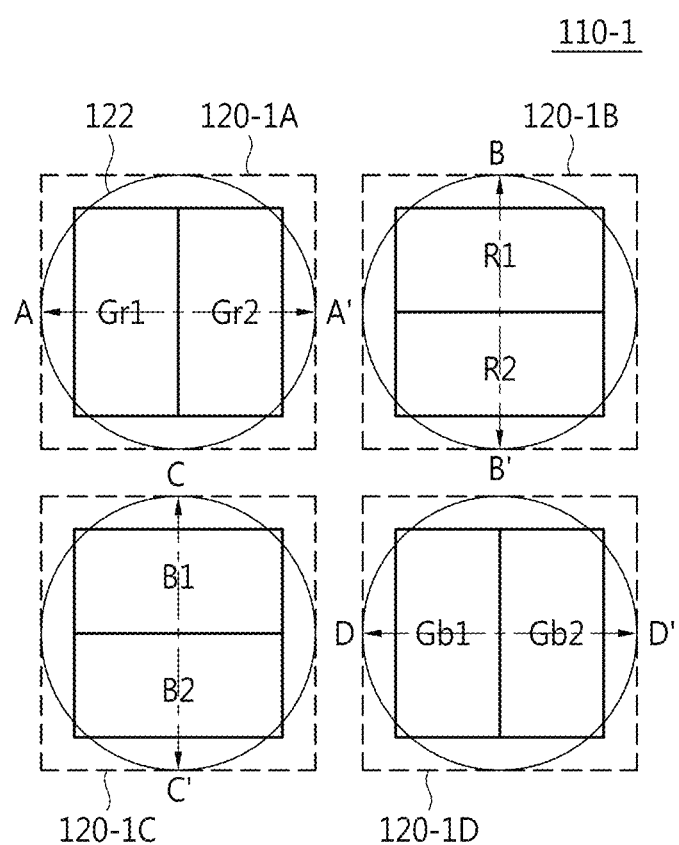
FIGS. 3 to 8 illustrate various examples of a pixel array of FIG. 2 according to embodiments of the disclosure.

A pixel array 110-1 illustrated in FIG. 3 may include the first pixel 120-1A to the fourth pixel 120-1D arranged in a Bayer pattern. That is, the first pixel 120-1A may be a green-on-red (Gr) pixel including a green filter (not shown). The second pixel 120-1B may be a red (R) pixel including a red filter (not shown). The third pixel 120-1C may be a blue (B) pixel including a blue filter (not shown). The fourth pixel 120-1D may be a green-on-blue (Gb) pixel including a green filter (not shown)

Each of the first pixel 120-1A to the fourth pixel 120-1D may include one lens 122 having an area corresponding thereto.

Also, the first pixel 120-1A may include two photo diodes Gr1 and Gr2, the second pixel 120-1B may include two photo diodes R1 and R2, the third pixel 120-1C may include two photo diodes B1 and B2, and the fourth pixel 120-1D may include two photo diodes Gb1 and Gb2.

In the present embodiment, the first pixel 120-1A which is a green pixel includes the photo diodes Gr1 and Gr2 separated in a first direction, and the fourth pixel 120-1D which is a green pixel includes the photo diodes Gb1 and Gb2 which are also separated in the first direction.

In contrast, the second pixel 120-1B which is a red pixel includes the photo diodes R1 and R2 separated in a second direction, and the third pixel 120-1C which is a blue pixel includes the photo diodes B1 and B2 which are also separated in the second direction.

Here, the first direction is defined as a vertical direction (e.g., a direction indicated by a line B-B' or C-C' in FIG. 3) or a column direction, and the second direction is defined as a horizontal direction (e.g., a direction indicated by a line A-A' or D-D' in FIG. 3) or a row direction, but exemplary embodiments of the disclosure are not limited thereto.

The two diodes Gr1 and Gr2 of the first pixel 120-1A are arranged in the row direction (a direction parallel to the line A-A) and may have a long shape in the column direction (a direction perpendicular to the line A-A') in the first pixel 120-1A. The two diodes R1 and R2 of the second pixel 120-1B are arranged in the column direction (a direction parallel to the line B-B'), and may have a long shape in the row direction (a direction perpendicular to the line B-B').

The structures and operations of the first pixel 120-1A to the fourth pixel 120-1D are substantially the same, except for the color filters thereof and the directions in which the photo diodes thereof are separated. Thus, the embodiments of FIGS. 3 to 8 will be described with respect to the first pixel 120-1A here.

The first pixel 120-1A includes the first photo diode Gr1 and the second photo diode Gr2, and may generate a pixel signal including a first sub-pixel signal corresponding to a photocharge accumulated in the first photo diode Gr1 and a second sub-pixel signal corresponding to a photocharge accumulated in the second photo diode Gr2.

When the sum of the first sub-pixel signal and the second sub-pixel signal is detected, data (two-dimensional (2D) image information) which is the same as a pixel signal generated by a pixel having one photo diode may be obtained by the ISP 220.

When a difference between the first sub-pixel and the second sub-pixel signal is detected, auto-focusing information and/or depth information corresponding to the position of the first pixel 120-1A may be obtained by the ISP 220.

The auto-focusing information represents whether a location on an image (which is to be generated) corresponding to the first pixel 120-1A is in focus and a degree to which the location on the image is out of focus. For example, if a user wants to bring the location on the image into focus with respect to the first pixel 120-1A, the camera control unit 210 may transmit lens control information to the control register block 180 based on the auto-focusing information when the auto-focusing information represents that the location on the image corresponding to the first pixel 120-1A is out of focus. The control register block 180 may control the distance between the lens 500 and the pixel array 110, based on the lens control information.

An operation of controlling the distance between the lens 500 and the pixel array 110 based on the auto-focusing information may be referred to as 'auto-focusing'.

Auto-focusing information for the first direction (e.g., a vertical direction) may be calculated from the first pixel 120-1A and the fourth pixel 120-1D each having two photo diodes separated in the first direction. Auto-focusing information for the second direction (e.g., a horizontal direction) may be calculated from the second pixel 120-1B and the third pixel 120-1C each having two photo diodes separated in the second direction.

The depth information is information regarding the distance between an object 350 corresponding to a location on an image (which is to be generated) corresponding to the first pixel 120-1A and the pixel array 110 (or the lens 500). Thus, the ISP 220 may generate 3D image data by synthesizing the depth information and the 2D image information.

The first sub-pixel signal and the second sub-pixel signal are generated when photocharges generated by receiving light, which passes through the same micro-lens, at physically different positions are accumulated in different photo diodes. Thus, the difference between the first sub-pixel signal and the second sub-pixel signal includes information regarding a phase difference between the first sub-pixel signal and the second sub-pixel signal. The auto-focusing information and the depth information may be obtained using the information regarding the phase difference.

Figure 4:
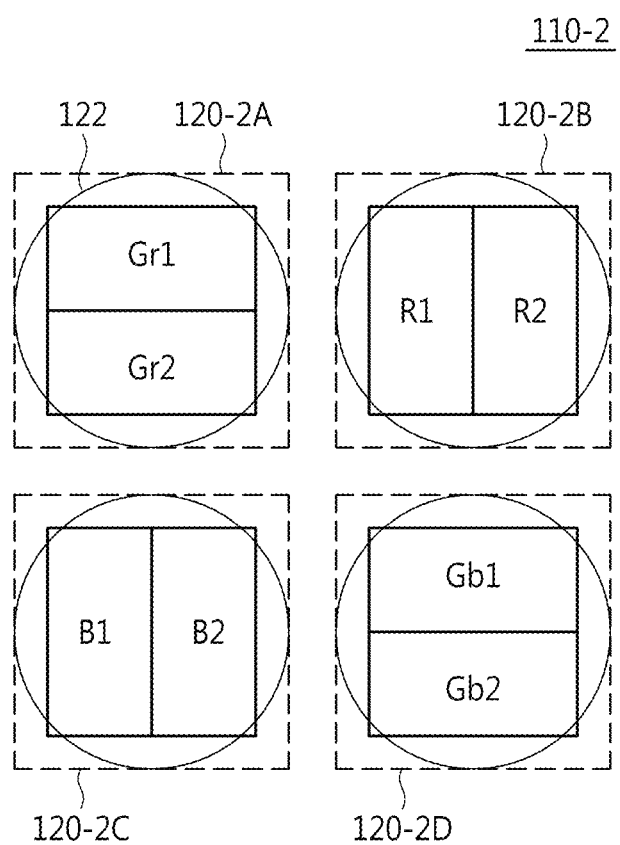

A pixel array 110-2 illustrated in FIG. 4 may include a first pixel 120-2A to a fourth pixel 120-2D arranged in the Bayer pattern. The pixel array 110-2 is substantially the same as the pixel array 110-1 of FIG. 3 except for the following differences. Thus, parts of the pixel array 110-2 that are substantially the same as those of the pixel array 110-1 are not described here.

The first pixel 120-2A may include two photo diodes Gr1 and Gr2. The second pixel 120-2B may include two photo diodes R1 and R2. The third pixel 120-2C may include two photo diodes B1 and B2. The fourth pixel 120-2D may include two photo diodes Gb1 and Gb2.

In the embodiment of FIG. 4, the first pixel 120-2A which is a green pixel includes the photo diodes Gr1 and Gr2 separated in a second direction (e.g., a horizontal direction), and the fourth pixel 120-2D which is a green pixel includes the photo diodes Gb1 and Gb2 which are also separated in the second direction.

In contrast, the second pixel 120-2B which is a red pixel includes the photo diodes R1 and R2 separated in a first direction (e.g., a vertical direction), and the third pixel 120-2C which is a blue pixel includes the photo diodes B1 and B2 which are also separated in the first direction.

The pixel array 110-2 is the same as the pixel array 110-1 of FIG. 3 in that 2D image information, auto-focusing information, and depth information may be obtained from sub-pixel signals generated by each of the first to fourth pixels 120-2A to 120-2D (e.g., the first pixel 120-2A). However, since the direction in which the two photo diodes included in each of the first to fourth pixels 120-2A to 120-2D (e.g., the first pixel 120-2A) are arranged is different from that in the two diodes in the pixel array 110-1 of FIG. 3, the 2D image information, the auto-focusing information, and the depth information generated from each of the first to fourth pixels 120-2A to 120-2D (e.g., the first pixel 120-2A) may be slightly different, compared to those in the pixel array 110-1 of FIG. 3.

Figure 5:
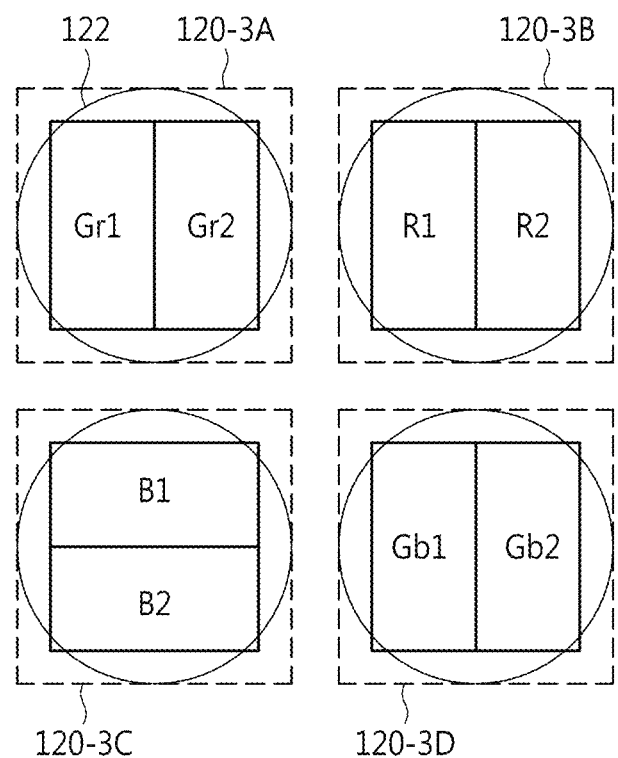

A pixel array 110-3 illustrated in FIG. 5 may include a first pixel 120-3A to a fourth pixel 120-3D arranged in the Bayer pattern. The pixel array 110-3 is substantially the same as the pixel array 110-1 of FIG. 3 except for the following differences. Thus, parts of the pixel array 110-3 that are substantially the same as those of the pixel array 110-1 are not described here.

In the embodiment of FIG. 5, the structures of the first pixel 120-3A, the third pixel 120-3C, and the fourth pixel 120-3D are substantially the same as those of the first pixel 120-1A, the third pixel 120-1C, and the fourth pixel 120-1D of FIG. 3.

However, the second pixel 120-1B which is a red pixel includes the photo diodes R1 and R2 separated in the second direction (e.g., the horizontal direction) in the embodiment of FIG. 3, whereas the second pixel 120-3B which is a red pixel includes photo diodes R1 and R2 separated in the first direction (e.g., the vertical direction) in the embodiment of FIG. 5.

As in the embodiment of FIG. 5, a direction (e.g., a vertical direction) in which the two photo diodes R1 and R2 of the second pixel 120-3B which is a red pixel are separated and a direction (e.g., a horizontal direction) in which two photo diodes B1 and B2 of the third pixel 120-3C which is a blue pixel are separated may be different from each other.

However, the directions in which photo diodes of the pixels 120-3A and 120-3D which are same-type (or same-color) pixels are separated are the same.

Figure 6:
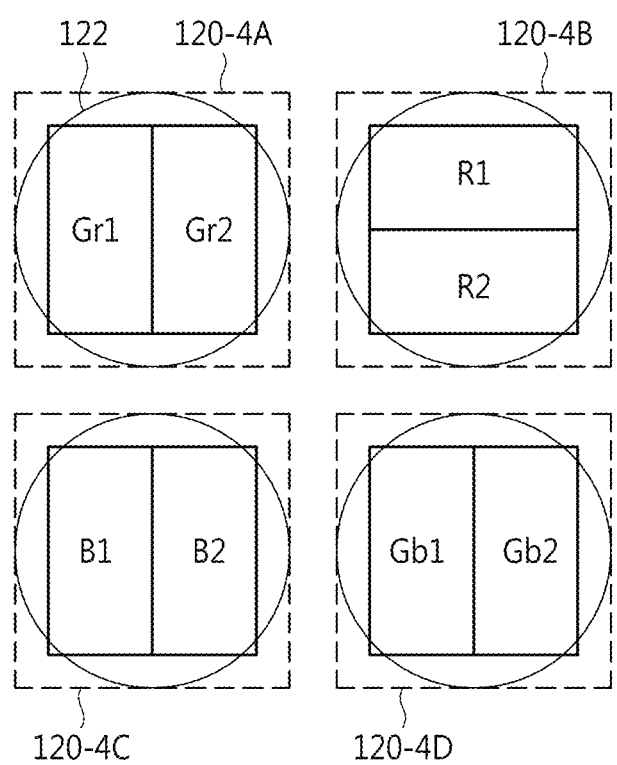

Similarly, a pixel array 110-4 illustrated in FIG. 6 may include a first pixel 120-4A to a fourth pixel 120-4D arranged in the Bayer pattern. The pixel array 110-4 is substantially the same as the pixel array 110-1 of FIG. 3 except for the following differences. Thus, parts of the pixel array 110-4 that are substantially the same as those of the pixel array 110-1 are not described here.

In the embodiment of FIG. 6, the structures of the first pixel 120-4A, the second pixel 120-4B, and the fourth pixel 120-4D are substantially the same as those of the first pixel 120-1A, the second pixel 120-1B, and the fourth pixel 120-1D of FIG. 3.

However, the third pixel 120-1C which is a blue pixel includes the photo diodes B1 and B2 separated in the second direction (e.g., the horizontal direction) in the embodiment of FIG. 3, whereas the third pixel 120-4C which is a blue pixel includes photo diodes B1 and B2 separated in a first direction (e.g., a vertical direction) in the embodiment of FIG. 6.

As in the embodiment of FIG. 6, a direction (e.g., a horizontal direction) in which two photo diodes R1 and R2 of the second pixel 120-4B which is a red pixel are separated and a direction (e.g., the vertical direction) in which the two photo diodes B1 and B2 of the third pixel 120-4C which is a blue pixel are separated may be different from each other.

However, directions in which same type (or same-color) pixels (e.g., the pixels 120-4A and 120-4D) are separated are the same.

Figure 7:
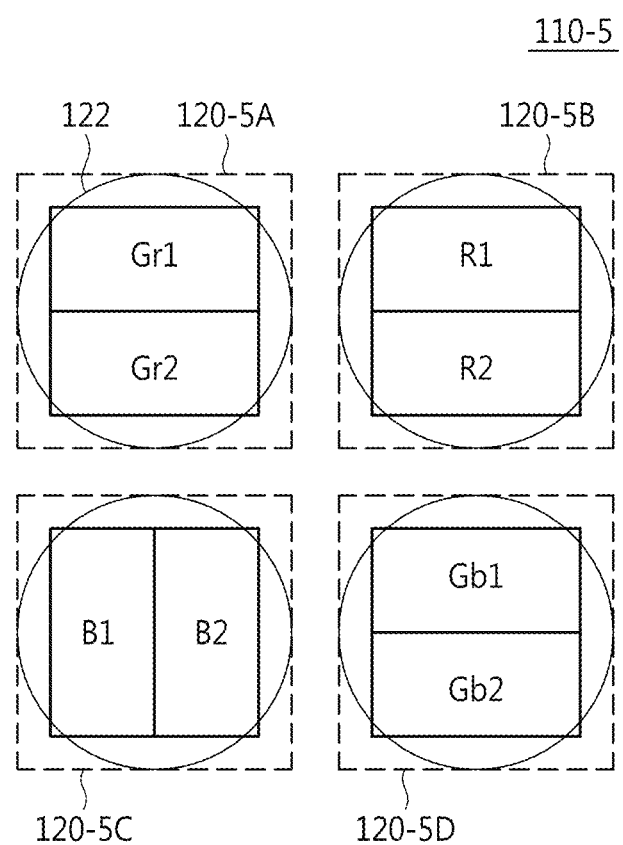

Similarly, a pixel array 110-5 illustrated in FIG. 7 includes a first pixel 120-5A to a fourth pixel 120-5D arranged in the Bayer pattern. The pixel array 110-5 is substantially the same as the pixel array 110-2 of FIG. 4 except for the following differences. Thus, parts of the pixel array 110-5 that are substantially the same as those of the pixel array 110-2 are not described here.

In the embodiment of FIG. 7, the structures of the first pixel 120-5A, the third pixel 120-5C, and the fourth pixel 120-5D are substantially the same as those of the first pixel 120-2A, the third pixel 120-2C, and the fourth pixel 120-2D of FIG. 4.

However, the second pixel 120-2B which is a red pixel includes the photo diodes R1 and R2 separated in the first direction (e.g., the vertical direction) in the embodiment of FIG. 4, whereas the second pixel 120-5B which is a red pixel includes photo diodes R1 and R2 separated in a second direction (e.g., a horizontal direction) in the embodiment of FIG. 7.

Figure 8:
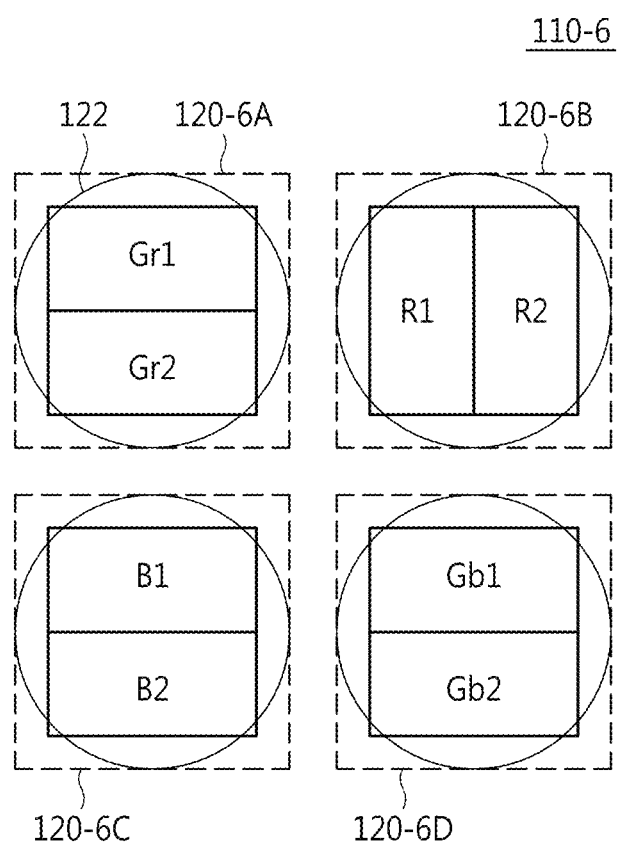

Similarly, a pixel array 110-6 of FIG. 8 may include a first pixel 120-6A to a fourth pixel 120-6D arranged in the Bayer pattern. The pixel array 110-6 is substantially the same as the pixel array 110-2 of FIG. 4 except for the following differences. Thus, parts of the pixel array 110-6 that are substantially the same as those of the pixel array 110-2 are not described here.

In the embodiment of FIG. 8, the structures of the first pixel 120-6A, the second pixel 120-6B, and the fourth pixel 120-6D are substantially the same as those of the first pixel 120-2A, the second pixel 120-2B, and the fourth pixel 120-2D of FIG. 4.

However, the third pixel 120-2C which is a blue pixel includes the photo diodes B1 and B2 separated in the first direction (e.g., the vertical direction) in the embodiment of FIG. 4, whereas the third pixel 120-6C which is a blue pixel includes photo diodes B1 and B2 separated in a second direction (e.g., a horizontal direction) in the embodiment of FIG. 8.

As described above, according to an embodiment of the disclosure, pixels of at least one type (e.g., a G pixel) may include two photo diodes separated in a first direction, and pixels of another type (e.g., an R or B pixel) may include two photo diodes separated in a second direction among pixels having an RGB Bayer pattern. The first direction and the second direction are different directions. In one exemplary embodiment, the first and second directions may be perpendicular to each other (i.e., the difference between the first and second directions may be an angle of 90 degrees).

As described above, a direction in which two photo diodes included in a color pixel of one type are separated and a direction in which two photo diodes included in a color pixel of another type are separated are set to be different, so that an effect achieved when four photo diodes are included in each pixel may be achieved when auto-focusing information is calculated.

When four photo diodes are included in each pixel, both of auto-focusing information for a vertical direction and auto-focusing information for a horizontal direction may be calculated.

However, when four photo diodes are included in each pixel, the size of a pixel array and data rates increase, thereby increasing power consumption and generating a large amount of heat.

In contrast, according to an embodiment of the disclosure, two photo diodes are included in each pixel and a direction in which the two photo diodes are separated is differently set according to the type of a color pixel, so that both of auto-focusing information for a vertical direction and auto-focusing information for a horizontal direction may be obtained while decreasing the size of a pixel array and data rates, compared to a structure including four photo diodes in each pixel.

The pixels illustrated in FIGS. 3 to 8 (e.g., the pixel 120-1A) each include two photo diodes, and auto-focusing information may be extracted from a signal output from each of the pixels (e.g., the pixel 120-1A). Thus, the pixels illustrated in FIGS. 3 to 8 (e.g., the pixel 120-1A) may be referred to as auto-focusing pixels.

Adding of sub-pixel signals or subtracting of the sub-pixel signals from each other as described above with reference to FIGS. 3 to 8 may be performed at an analog level or a digital level. That is, the adding or the subtracting of the sub-pixel signals at the analog level may be performed through operations of a plurality of capacitors (not shown) and a plurality of switches (not shown) of the ADC block 140 connected to column lines (e.g., the column lines COL1 to COLm of FIG. 2) connected to the respective pixels (e.g., the pixel 120-1A). The adding or the subtracting of the sub-pixel signals at the digital level may be performed by the ISP 220 configured to receive signals obtained by performing analog-to-digital conversion (ADC) on the sub-pixel signals.

Figure 9:
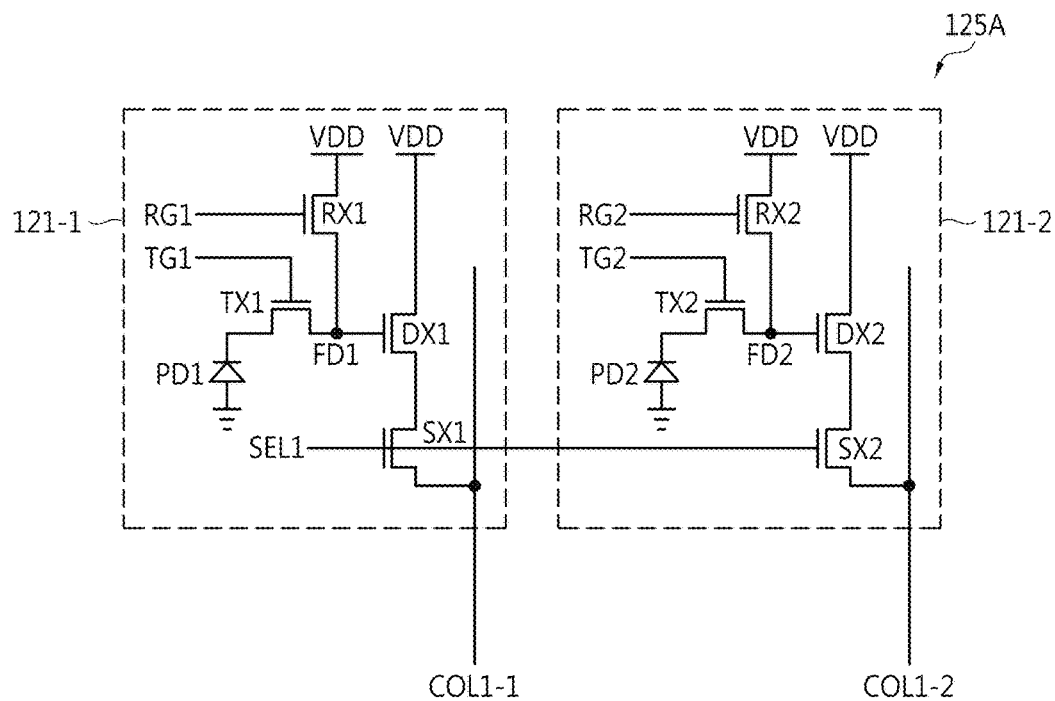
FIG. 9 is a circuit diagram of a pixel, such as those shown in FIGS. 3 to 8, according to an embodiment of the disclosure.

FIG. 9 is a circuit diagram of a pixel 125A, such as those shown in FIGS. 3 to 8, according to an embodiment of the disclosure. Referring to FIGS. 3 to 9, the pixels 120-1A to 120-6D illustrated in FIGS. 3 to 8 have substantially the same structures and operations in view of a circuit aspect. Thus, for convenience of explanation, the pixel 125A of FIG. 9 will be described using one of the pixels 120-1A to 120-6D (e.g., the pixel 120-1A of FIG. 3) below.

The pixel 125A is an equivalent circuit of the first pixel 120-1A of FIG. 3, and includes a first sub-pixel 121-1 and a second sub-pixel 121-2.

The first sub-pixel 121-1 may include a first photo diode PD1, a first transmission transistor TX1, a first floating diffusion node FD1, a first reset transistor RX1, a first drive transistor DX1, and a first selection transistor SX1.

The second sub-pixel 121-2 may include a second photo diode PD2, a second transmission transistor TX2, a second floating diffusion node FD2, a second reset transistor RX2, a second drive transistor DX2, and a second selection transistor SX2.

The first photo diode PD1 and the second photo diode PD2 are examples of a photoelectric conversion element, and may include at least one among a photo transistor, a photo gate, and a pinned photo diode (PPD).

First and second transmission control signals TG1 and TG2, first and second reset control signals RG1 and RG2, and first selection control signal SEL1 are control signals output from the row driver 160. Pixels (e.g., the pixels P11 to P1m) belonging to the same row of the pixel array 110 may receive the first and second transmission control signals TG1 and TG2 of the same timing, the first and second reset control signals RG1 and RG2 of the same timing.

An operation of the first sub-pixel 121-1 will be described below. The first photo diode PD1 generates a photocharge corresponding to the intensity of light incident from an object 350.

One end of the first photo diode PD1 may be connected to the first transmission transistor TX1, and another end thereof may be connected to a ground voltage VSS source. A ground voltage VSS may be, for example, 0V.

The first transmission transistor TX1 may transmit the photocharge generated by the first photo diode PD1 to the first floating diffusion node FD1 in response to the first transmission control signal TG1.

The first drive transistor DX1 may amplify and transmit the photocharge to the first selection transistor SX1, based on an electric potential according to the photocharge accumulated in the first floating diffusion node FD1.

A drain terminal of the first selection transistor SX1 may be connected to a source terminal of the first drive transistor DX1. The first selection transistor SX1 may output a first sub-pixel signal to the first sub-column line COL1-1 connected to the first sub-pixel 121-1 according to the first selection control signal SEL1.

The first reset transistor RX1 resets the first floating diffusion node FD1 to a power supply voltage VDD according to the first reset control signal RG1. The power supply voltage VDD means a driving voltage of the pixel array 110, and may have, for example, a range of 2 V to 5 V.

The structure and operation of the second sub-pixel 121-2 are substantially the same as those of the first sub-pixel 121-1. The operation of the second sub-pixel 121-2 will now be described. The second photo diode PD2 generates a photocharge according to the intensity of light incident from the object 350.

One end of the second photo diode PD2 may be connected to the second transmission transistor TX2, and another end thereof may be connected to the ground voltage VSS source.

The second transmission transistor TX2 may transmit the photocharge generated by the second photo diode PD2 to the second floating diffusion node FD2 in response to the second transmission control signal TG2.

The second drive transistor DX2 may amplify and transmit the photocharge to the second selection transistor SX2, based on an electric charge according to the photocharge accumulated in the second floating diffusion node FD2.

A drain terminal of the second selection transistor SX2 may be connected to a source terminal of the second drive transistor DX2. The second selection transistor SX2 transmits a second sub-pixel signal to the second sub-column line COL1-2 connected to the second sub-pixel 121-2 according to the first selection control signal SEL1.

The second reset transistor RX2 resets the second floating diffusion node FD2 to the power supply voltage VDD according to a second reset control signal RG2.

An operation of the pixel 125A will be described based on timings of signals. After the first and second floating diffusion nodes FD1 and FD2 are reset, reset signals corresponding to reset states of the first and second floating diffusion nodes FD1 and FD2 may be simultaneously output from the first and second sub-pixels 121-1 and 121-2 to the first and second sub-column lines COL1-1 and COL1-2.

Then, the first transmission transistor TX1 transmits the photocharge accumulated in the first photo diode PD1 to the first floating diffusion node FD1. Then the first drive transistor DX1 and the first selection transistor SX1 operate to output the first sub-pixel signal corresponding to the photocharge of the first photo diode PD1 via the first sub-column line COL1-1.

The second transmission transistor TX2 transmits the photocharge accumulated in the second photo diode PD2 to the floating diffusion node FD2. Then the second drive transistor DX2 and the second selection transistor SX2 operate to output the second sub-pixel signal corresponding to the photocharge of the second photo diode PD2 via the second sub-column line COL1-2, simultaneously with the outputting of the first sub-pixel signal.

In the embodiment of FIG. 9, the first and second sub-pixels 121-1 and 121-2 each additionally include four types of CMOS transistors TX, RX, DX, and SX, and are respectively connected to the additional sub-column lines COL1-1 and COL1-2. Thus, the first and second sub-pixel signals may be simultaneously output. However, exemplary embodiments of the disclosure are not limited thereto.

The number of transistors of each of the sub-pixels 121-1 and 121-2 and a connection between the transistors may be differently set according to an embodiment of the disclosure. Also, in an exemplary embodiment, at least one of the transistors and/or the floating diffusion nodes FD1 and FD2 of the sub-pixels 121-1 and 121-2 may be shared.

Figure 10:
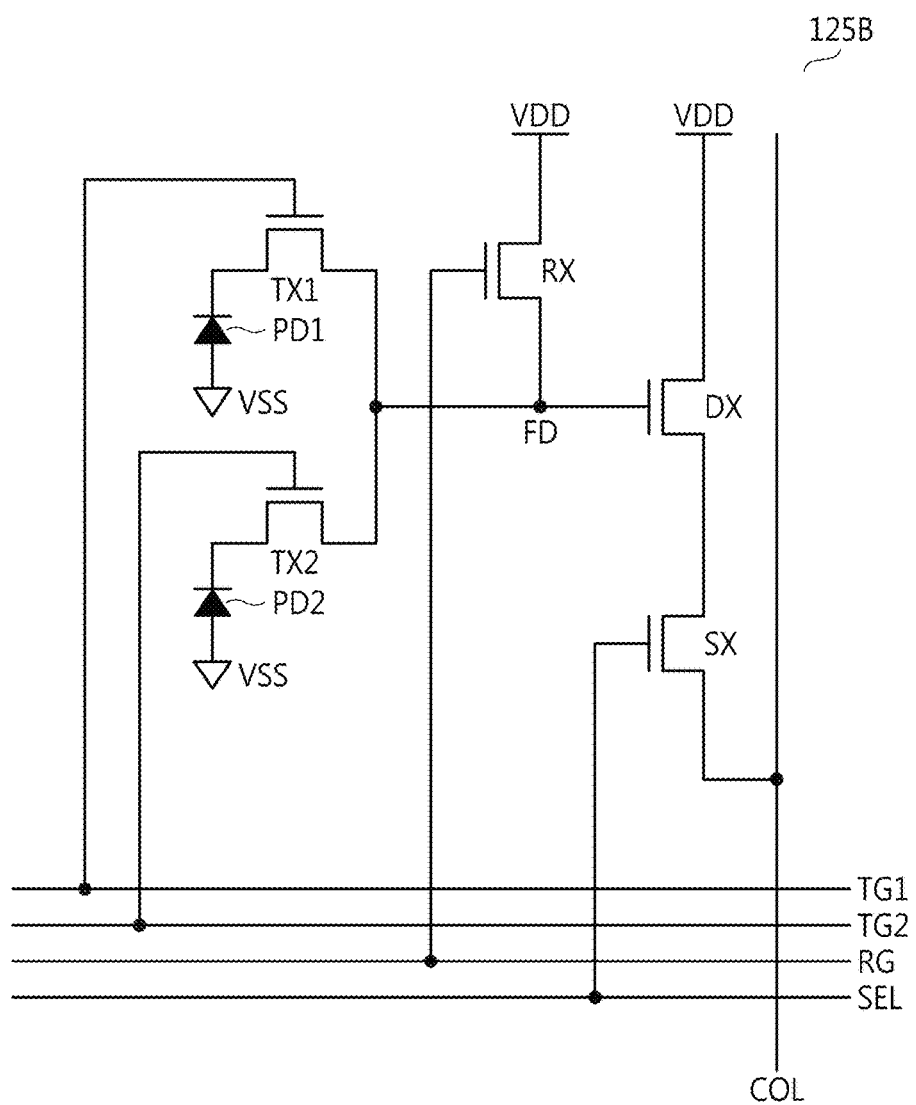
FIG. 10 is a circuit diagram of a pixel, such as those shown in FIGS. 3 to 8, according to another embodiment of the disclosure.

FIG. 10 is a circuit diagram of a pixel 125B, such as those shown in FIGS. 3 to 8, according to another embodiment of the disclosure. Referring to FIGS. 3 to 8 and 10, the structures and operations of the pixels 120-1A to 120-6D illustrated in FIGS. 3 to 8 are substantially the same in view of a circuit aspect. Thus, for convenience of explanation, the pixel 125B of FIG. 10 will be described using one of the pixels 120-1A to 120-6D (e.g., the pixel 120-1A of FIG. 3).

The pixel 125B is an equivalent circuit of the first pixel 120-1A of FIG. 3, and may include a first photo diode PD1, a second photo diode PD2, a first transmission transistor TX1, a second transmission transistor TX2, a floating diffusion node FD, a reset transistor RX, a drive transistor DX, and a selection transistor SX.

Although FIG. 10 illustrates the pixel 125B including four types of CMOS transistors TX1, TX2, RX, DX, and SX, exemplary embodiments of the disclosure are not limited thereto and are applicable to various circuits including at least three types of transistors.

The first photo diode PD1 and the second photo diode PD2 are examples of a photoelectric conversion element, and may include at least one among a photo transistor, a photo gate, and a pinned photo diode (PPD).

A first transmission control signal TG1, a second transmission control signal TG2, a reset control signal RG, and a selection control signal SEL are control signals output from the row driver 160. Pixels belonging to the same row of the pixel array 110 may receive the first transmission control signal TG1 at the same timing, the second transmission control signal TG2 at the same timing, the reset control signal RG at the same timing, and the selection control signal SEL at the same timing.

Operations of the elements of the pixel 125B will be described below. Each of the first photo diode PD1 and the second photo diode PD2 generates a photocharge according to the intensity of light incident from the object 350. One end of the first photo diode PD1 and one end of the second photo diode PD2 may be respectively connected to the first transmission transistor TX1 and the second transmission transistor TX2, and another end of each of them may be connected to a ground voltage VSS source. A ground voltage VSS may be, for example, 0V.

The first transmission transistor TX1 and the second transmission transistor TX2 may transmit the generated photocharges to the floating diffusion node FD according to the first transmission control signal TG1 and the second transmission control signal TG2.

The drive transistor DX may amplify and transmit the photocharges to the selection transistor SX, based on an electric potential according to photocharges accumulated in the floating diffusion node FD.

A drain terminal of the selection transistor SX may be connected to a source terminal of the drive transistor DX. The selection transistor SX may output a pixel signal to a column line COL connected to the pixel 125B according to the selection control signal SEL.

The reset transistor RX may reset the floating diffusion node FD to a power supply voltage VDD according to the reset control signal RG. The power supply voltage VDD means a driving voltage of the pixel array 110, and may have, for example, a range of 2V to 5V.

An operation of the pixel 125B will be described using timings of signals below. After the floating diffusion node FD is reset by the reset transistor RX, the drive transistor DX and the selection transistor SX operate to output an electrical signal corresponding to a reset state of the floating diffusion node FD via a column line COL.

Then, the first transmission transistor TX1 transmits a photocharge accumulated in the first photo diode PD1 to the floating diffusion node FD, and the drive transistor DX and the selection transistor SX operate to output a first sub-pixel signal which is an electrical signal corresponding to the photocharge of the first photo diode PD1 via the column line COL.

Then, after the floating diffusion node FD is reset again by the reset transistor RX, the drive transistor DX and the selection transistor SX operate to output an electrical signal corresponding to a reset state of the floating diffusion node FD via the column line COL. According to another exemplary embodiment, the resetting of the floating diffusion node FD may be skipped when the ADC block 140 stores an electrical signal corresponding to a previous reset state of the floating diffusion node FD.

Next, the second transmission transistor TX2 transmits a photocharge accumulated in the second photo diode PD2 to the floating diffusion node FD and then the drive transistor DX and the selection transistor SX operate to output a second sub-pixel signal, which is an electrical signal corresponding to the photocharge of the second photo diode PD2, via the column line COL.

The ADC block 140 may remove reset noise by subtracting the electrical signal corresponding to the reset state from each of the electrical signal corresponding to the photocharge of the first photo diode PD1 and the electrical signal corresponding to the photocharge of the second photo diode PD2. The electrical signal which corresponds to the photocharge of the first photo diode PD1 and from which the reset noise is removed may correspond to the first sub-pixel signal. The electrical signal which corresponds to the photocharge of the second photo diode PD2 and from which the reset noise is removed may correspond to the second sub-pixel signal.

In the embodiment of FIG. 10, the first sub-pixel signal and the second sub-pixel signal are sequentially output to the same column line COL.

Figure 11:
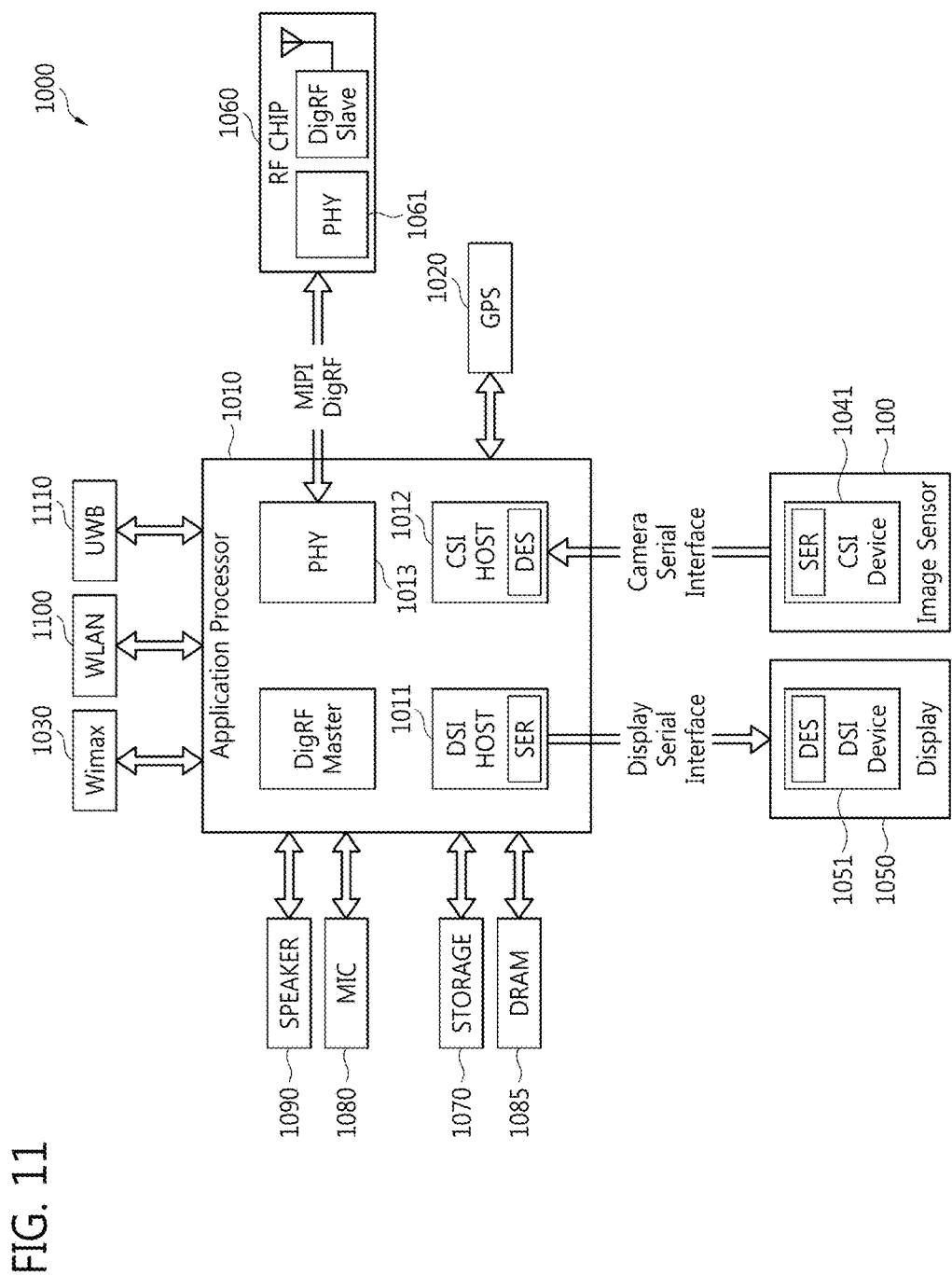
FIG. 11 is a block diagram of an electronic system including the image sensor of FIG. 1, according to an embodiment of the disclosure.

FIG. 11 is a block diagram of an electronic system 1000 including the image sensor 100 of FIG. 1, according to an embodiment of the disclosure.

Referring to FIG. 11, the electronic system 1000 may be a data processing apparatus capable of using or supporting a mobile industry processor interface (MIPI), e.g., a mobile phone, a personal digital assistant (PDA), a portable multimedia player (PMP), an internet protocol television (IPTV), or a smart phone.

The electronic system 1000 includes an application processor 1010, the image sensor 100, and a display unit 1050.

A camera serial interface (CSI) host 1012 included in the application processor 1010 may establish serial communication with a CSI device 1041 of the image sensor 100 through a CSI. For example, an optical deserializer may be included in the CSI host 1012, and an optical serializer may be included in the CSI device 1041.

A display serial interface (DSI) host 1011 included in the application processor 1010 may establish serial communication with a DSI device 1051 of the display 1050 through a DSI. For example, an optical serializer may be included in the DSI host 1011 and an optical deserializer may be included in the DSI device 1051.

The electronic system 1000 may further include a radio-frequency (RF) chip 1060 for communicating with the application processor 1010. A physical layer PHY 1013 of the application processor 1010 and a physical layer PHY 1061 of the RF chip 1060 may exchange data with each other according to the MIPI DigRF standard.

The electronic system 1000 may further include a global positioning system (GPS) 1020, a storage unit 1070, a microphone 1080, a dynamic random access memory (DRAM) 1085, and a speaker 1090. The electronic system 1000 may establish communication using world-wide interoperability for microwave (Wimax) 1030, a wireless local area network (WLAN) 1100, an ultra-wide band (UWB) 1110, etc.

Figure 12:
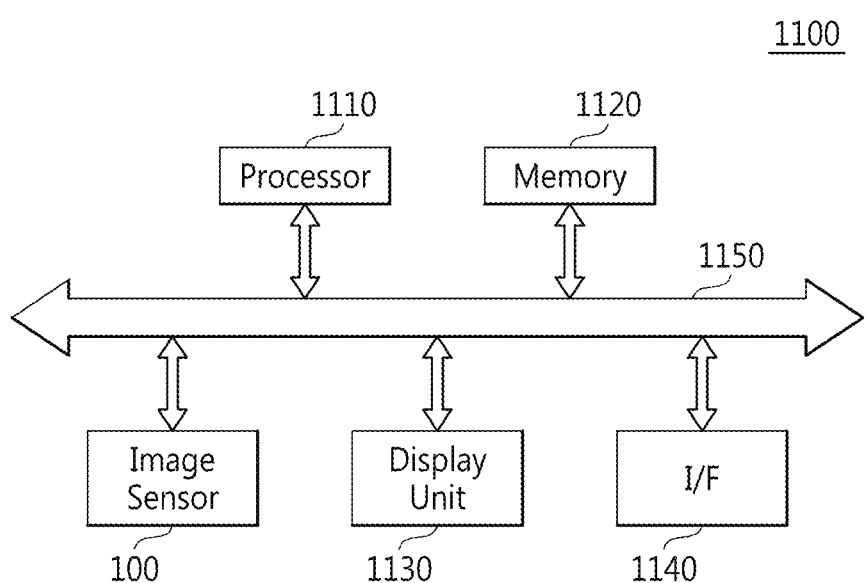
FIG. 12 is a block diagram of an image processing system including the image sensor of FIG. 1, according to another embodiment of the disclosure.

FIG. 12 is a block diagram of an image processing system 1100 including the image sensor 100 of FIG. 1, according to another embodiment of the disclosure. Referring to FIG. 12, the image processing system 1100 may be a mobile phone, a PDA, a PMP, an IPTV, or a smart phone but is not limited thereto.

The image processing system 1100 may include a processor 1110, a memory 1120, the image sensor 100, a display unit 1130, and an interface unit 1140.

The processor 1110 may control an operation of the image sensor 100. The memory 1120 may store a program for controlling an operation of the image sensor 100 via a bus 1150 and the generated image described above, under control of the processor 1110. The processor 1110 may execute the program by accessing the stored information. The memory 1120 may be, for example, a non-volatile memory.

The image sensor 100 may operate and generate image information under control of the processor 1110. The image sensor 100 may be embodied as a part of a camera module (not shown).

The display unit 1130 may receive the generated image from the processor 1110 or the memory 1120, and display the generated image on the display unit 1130, e.g., a liquid crystal display (LCD) or an active-matrix organic light-emitting diode (AMOLED).

The interface unit 1140 may be configured to receive a user input or to input or output an image. In one exemplary embodiment, the interface unit 1140 may be a wireless interface unit.

The present general disclosure can also be embodied as computer-readable codes on a computer-readable recording medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general disclosure can be easily constructed by programmers.

According to an embodiment of the disclosure, a plurality of pieces of auto-focusing information for respective different directions may be calculated by including two photo diodes in each pixel and differently setting a direction in which two photo diodes included in a color pixel of one type are separated and a direction in which two photo diodes included in a color pixel of another type are separated. Thus, an effect achieved when four photo diodes are included in each pixel may be achieved using two photo diodes included in each pixel.

Thus, both of auto-focusing information for a vertical direction and auto-focusing information for a horizontal direction may be obtained while decreasing auto-focusing data rates to be output.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to exemplary embodiments thereof, it will be understood that various changes in form and details may be made therein without departing from the spirit and scope of the following claims.

What is claimed is:

1. An image sensor comprising:
    a pixel array including first to fourth pixels having an R, G, and B Bayer pattern;
    an analog-to-digital converter (ADC) block configured to convert a pixel signal of each of the first to fourth pixels into a digital pixel signal; and
    a control block configured to control the pixel array and the ADC block, wherein:
    the first and fourth pixels are green pixels each including a green filter, the second pixel is a red pixel including a red filter, and the third pixel is a blue pixel including a blue filter,
    each of the first and fourth pixels comprises two photo diodes separated in a first direction, and
    at least one of the second and third pixels comprises two photo diodes separated in a second direction, which is different from the first direction.

2. The image sensor of claim 1, wherein a difference between the first direction and the second direction is an angle of 90 degrees.

3. The image sensor of claim 1, wherein
    each of the second and third pixels comprises the two photo diodes separated in the second direction.

4. The image sensor of claim 1, wherein
    the other of the second and third pixels comprises the two photo diodes separated in the first direction.

5. The image sensor of claim 1, wherein:
the first pixel comprise the two photo diodes separated in the first direction and the two photo diodes accumulate a photocharge corresponding to intensity of incident light passing through one micro-lens, and
the first pixel comprises a plurality of transistors configured to convert the photocharge accumulated in the two photo diodes thereof into first and second sub-pixel signals which are electrical signals and output the first and second sub-pixel signals, wherein a number of the plurality of transistors of each pixel is two or more.

6. The image sensor of claim 5, wherein auto-focusing information is calculated based on a difference between the first and second sub-pixel signals.

7. The image sensor of claim 5, wherein the first and second sub-pixel signals are simultaneously output via different sub-column lines.

8. The image sensor of claim 5, wherein the first and second sub-pixel signals are sequentially output via the same column line.

9. An image sensor comprising:
a pixel array including a plurality of pixels having an R, G, and B Bayer pattern; and
an analog-to-digital converter (ADC) block configured to convert a pixel signal of each of the plurality of pixels into a digital pixel signal, wherein:
the plurality of pixels comprises:
 a first-type pixel including two photo diodes separated in a first direction;
 a second-type pixel including two photo diodes separated in a second direction which is different from the first direction; and
 a third-type pixel including two photo diodes separated in the first direction,
each of the first-type pixel and third-type pixel is a green pixel including a green filter and the second-type pixel is a red pixel including a red filter or a blue pixel including a blue filter,
first auto-focusing information for the first direction is calculated based on a signal output from the first-type pixel, and
second auto-focusing information for the second direction is calculated based on a signal output from the second-type pixel.

10. The image sensor of claim 9, wherein a difference between the first direction and the second direction is an angle of 90 degrees.

11. The image sensor of claim 9, wherein each of the plurality of pixels further comprises:
one micro-lens; and
a plurality of transistors configured to convert photocharges accumulated in the two photo diodes into first and second sub-pixel signals, which are electrical signals, according to an intensity of light passing through the micro-lens, and output the first and second sub-pixel signals, wherein a number of the plurality of transistors of each pixel is two or more.

12. The image sensor of claim 11, wherein:
the first auto-focusing information for the first direction is calculated based on a difference between the first and second sub-pixel signals of the first-type pixel, and
the second auto-focusing information for the second direction is calculated based on a difference between the first and second sub-pixel signals of the second-type pixel.

13. An image processing system comprising:
an image sensor comprising:
a pixel array including a plurality of auto-focusing pixels;
an analog-to-digital converter (ADC) block configured to convert a pixel signal of each of the plurality of auto-focusing pixels into a digital pixel signal; and
an image processor configured to extract auto-focusing information for an auto-focusing operation from the digital pixel signal, wherein:
the auto-focusing pixels comprise:
 a first-type pixel including two photo diodes separated in a first direction;
 a second-type pixel including two photo diodes separated in a second direction which is different from the first direction; and
 a third-type pixel including two photo diodes separated in the first direction, and
each of the first-type pixel and third-type pixel is a green pixel including a green filter and the second-type pixel is a red pixel including a red filter or a blue pixel including a blue filter.

14. The image processing system of claim 13, wherein a difference between the first direction and the second direction is an angle of 90 degrees.

15. The image processing system of claim 13, wherein the auto-focusing information comprises:
auto-focusing information for the first direction; and
auto-focusing information for the second direction, wherein
the image processor calculates the auto-focusing information for the first direction, based on a digital pixel signal output from the first-type pixel, and calculates the auto-focusing information for the second direction, based on a digital pixel signal output from the second-type pixel.

* * * * *